(12) United States Patent  (10) Patent No.: US 8,307,626 B2
Sheridan  (45) Date of Patent: Nov. 13, 2012

(54) AUXILIARY PUMP SYSTEM FOR FAN DRIVE GEAR SYSTEM

(75) Inventor: William G. Sheridan, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 743 days.

(21) Appl. No.: 12/393,743

(22) Filed: Feb. 26, 2009

(65) Prior Publication Data
US 2010/0212281 A1 Aug. 26, 2010

(51) Int. Cl.
*F02C 7/06* (2006.01)

(52) U.S. Cl. ............. 60/39.08; 60/772; 60/802; 184/26; 184/27.2; 184/29; 415/110; 415/111; 415/112

(58) Field of Classification Search .................. 60/226.1, 60/772, 39.08, 802; 184/26, 6.11, 27.2, 29; 137/119.01, 118.01; 415/110–113
See application file for complete search history.

(56) References Cited

U.S. PATENT DOCUMENTS

| | | | |
|---|---|---|---|
| 1,871,055 A | 8/1932 | Hasbrouck | |
| 2,711,071 A * | 6/1955 | Frankel | 60/788 |
| 2,830,668 A | 4/1958 | Gaubis et al. | |
| 2,871,981 A | 2/1959 | Baits | |
| 2,984,975 A | 5/1961 | Rodgers et al. | |
| 4,153,141 A | 5/1979 | Methlie | |
| 4,309,870 A | 1/1982 | Guest et al. | |
| 4,431,372 A * | 2/1984 | Dadhich | 415/175 |
| 5,107,676 A | 4/1992 | Hadaway et al. | |
| 5,121,598 A | 6/1992 | Butler | |
| 5,433,674 A | 7/1995 | Sheridan et al. | |
| 5,472,009 A * | 12/1995 | Linderoth | 137/101 |
| 5,472,383 A | 12/1995 | McKibbin | |
| 5,588,503 A | 12/1996 | Rinaldo | |
| 5,769,182 A * | 6/1998 | Parenteau | 184/6.4 |
| 5,911,678 A | 6/1999 | White | |
| 6,223,616 B1 | 5/2001 | Sheridan | |
| 6,267,147 B1 | 7/2001 | Rago | |
| 6,793,042 B2 | 9/2004 | Brouillet | |
| 6,886,324 B1 * | 5/2005 | Handshuh et al. | 60/39.08 |
| 7,118,336 B2 | 10/2006 | Waddleton | |
| 7,712,317 B2 | 5/2010 | Scanlon | |
| 2006/0260323 A1 * | 11/2006 | Moulebhar | 60/793 |

FOREIGN PATENT DOCUMENTS

| | | |
|---|---|---|
| EP | 1925856 A2 | 5/2008 |
| FR | 2673676 A1 | 9/1992 |
| JP | 8270428 A | 10/1996 |

OTHER PUBLICATIONS

Extended European Search Report in foreign counterpart Application No. 09252941.1, dated Nov. 22, 2011.

* cited by examiner

*Primary Examiner* — Ehud Gartenberg
*Assistant Examiner* — Steven Sutherland
(74) *Attorney, Agent, or Firm* — Kinney & Lange, P.A.

(57) ABSTRACT

A pump system for lubricating a bearing in a gear system includes an auxiliary pump connected to the gear system. The auxiliary pump is fluidically connected to the bearing through an auxiliary supply passage and to a reservoir through an auxiliary scavenge passage. An auxiliary valve is fluidically connected to the auxiliary supply passage for transferring liquid from the auxiliary pump to the bearing when a pressure in the auxiliary supply passage downstream of the auxiliary valve is less than a particular threshold and for transferring liquid from the auxiliary pump to the reservoir when the pressure in the auxiliary supply passage downstream of the auxiliary valve is greater than the particular threshold. A method for circulating liquid is also included.

19 Claims, 4 Drawing Sheets

AUXILIARY PUMP SYSTEM FOR FAN DRIVE GEAR SYSTEM

BACKGROUND

The present invention relates to pump systems, and more particularly, to pump systems for lubricating a fan drive gear system in gas turbine engines.

In many gas turbine engines, a low pressure spool includes a low pressure turbine connected to and driving a low pressure compressor, and a high pressure spool includes a high pressure turbine connected to and driving a high pressure compressor. A main pump is typically driven by the high pressure spool, connected through gearing, and is used to pump lubricating liquid to all engine components that require lubrication. When the high pressure spool stops rotating or rotates at a reduced rpm (revolutions per minute), the main supply pump will ordinarily provide little or no liquid to engine components.

In some gas turbine engines, a fan at the front of the engine is connected to the low pressure spool through a fan drive gear system. When the high pressure spool stops rotating or rotates at a reduced rpm, the fan drive gear system can continue rotating. For example, wind may rotate the fan and corresponding gears and bearings while the aircraft is parked on the ground or during an in-flight engine shutdown. Certain gears and bearings can be damaged by non-lubricated operation.

SUMMARY

According to the present invention, a pump system for lubricating a bearing in a gear system includes an auxiliary pump connected to the gear system. The auxiliary pump is fluidically connected to the bearing through an auxiliary supply passage and to a reservoir through an auxiliary scavenge passage. An auxiliary valve is fluidically connected to the auxiliary supply passage for transferring liquid from the auxiliary pump to the bearing when a pressure in the auxiliary supply passage downstream of the auxiliary valve is less than a particular threshold and for transferring liquid from the auxiliary pump to the reservoir when the pressure in the auxiliary supply passage downstream of the auxiliary valve is greater than the particular threshold. A method for circulating liquid is also included.

DETAILED DESCRIPTION

In general, the present invention provides an auxiliary pump for providing lubricating liquid to bearings of a fan drive gear system in a gas turbine engine. The auxiliary pump is driven by a fan shaft and supplements a main pump driven by a high pressure spool. When the main pump supplies an adequate amount of liquid to the bearings, a three-way check-valve can use pressure to direct liquid pumped by the auxiliary pump back to a collection reservoir. When the main pump supplies less than an adequate amount of liquid, the three-way check-valve can automatically direct liquid pumped by the auxiliary pump to the bearings. The auxiliary pump can supply liquid to the bearings whenever the fan shaft is turning, because it is connected through gearing to the fan shaft.

Figure 1:
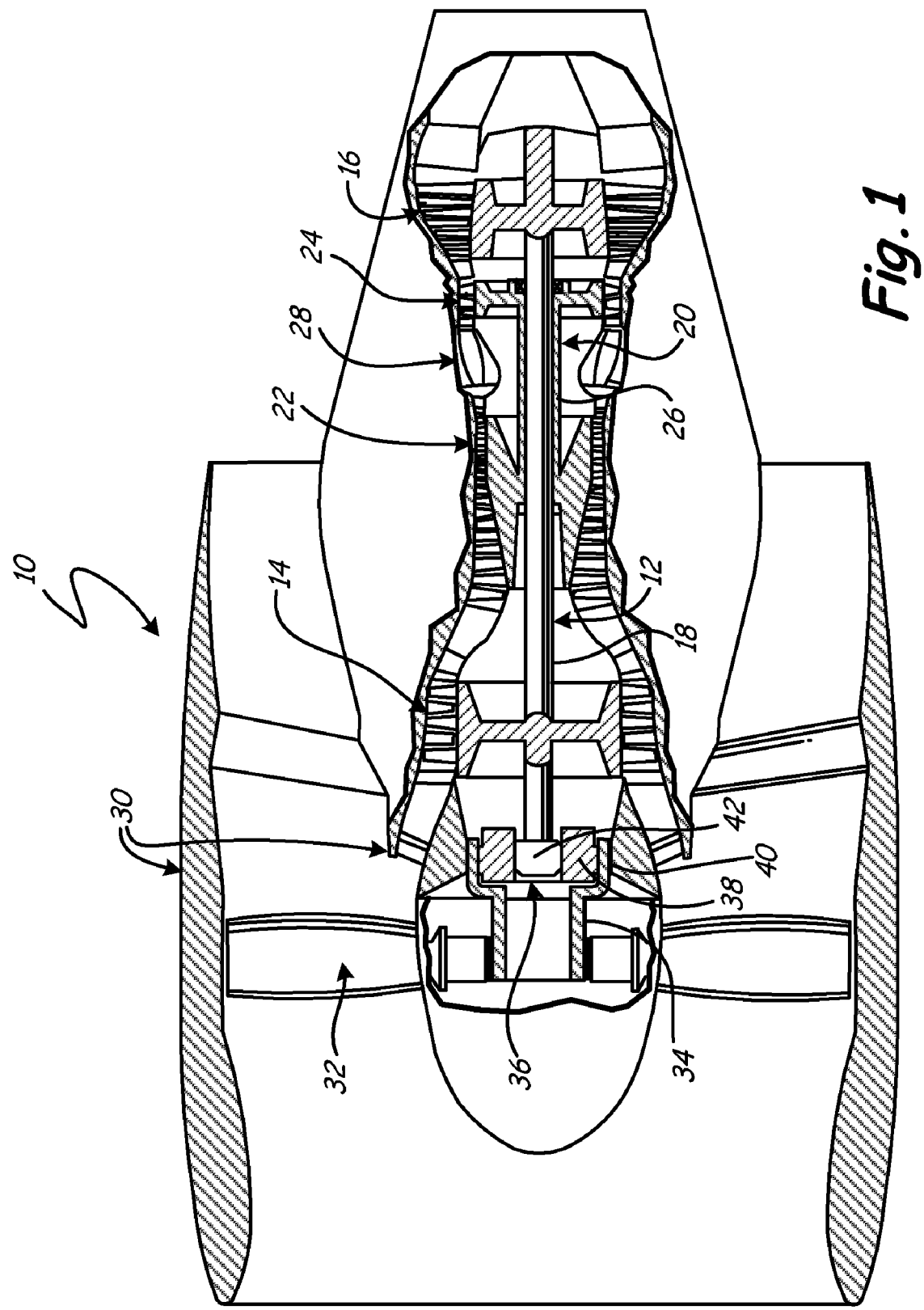
FIG. 1 is a schematic cross-sectional side view of a gas turbine engine with a fan drive gear system.

FIG. 1 is a schematic cross-sectional side view of gas turbine engine 10. Gas turbine engine 10 includes low pressure spool 12 (which includes low pressure compressor 14 and low pressure turbine 16 connected by low pressure shaft 18), high pressure spool 20 (which includes high pressure compressor 22 and high pressure turbine 24 connected by high pressure shaft 26), combustor 28, nacelle 30, fan 32, fan shaft 34, and fan drive gear system 36 (which includes star gear 38, ring gear 40, and sun gear 42). The general construction and operation of gas turbine engines is well-known in the art, and therefore detailed discussion here is unnecessary. However, a more detailed understanding of fan drive gear system 36 can be helpful. As shown in FIG. 1, low pressure spool 12 is coupled to fan shaft 34 via fan drive gear system 36. Sun gear 42 is attached to and rotates with low pressure shaft 18. Ring gear 40 is rigidly connected to fan shaft 34 which turns at the same speed as fan 32. Star gear 38 is coupled between sun gear 42 and ring gear 40 such that star gear 38 revolves around sun gear 42, when sun gear 42 rotates. When low pressure spool 12 rotates, fan drive gear system 36 causes fan shaft 34 to rotate at a slower rotational velocity than that of low pressure spool 12.

Figure 2:
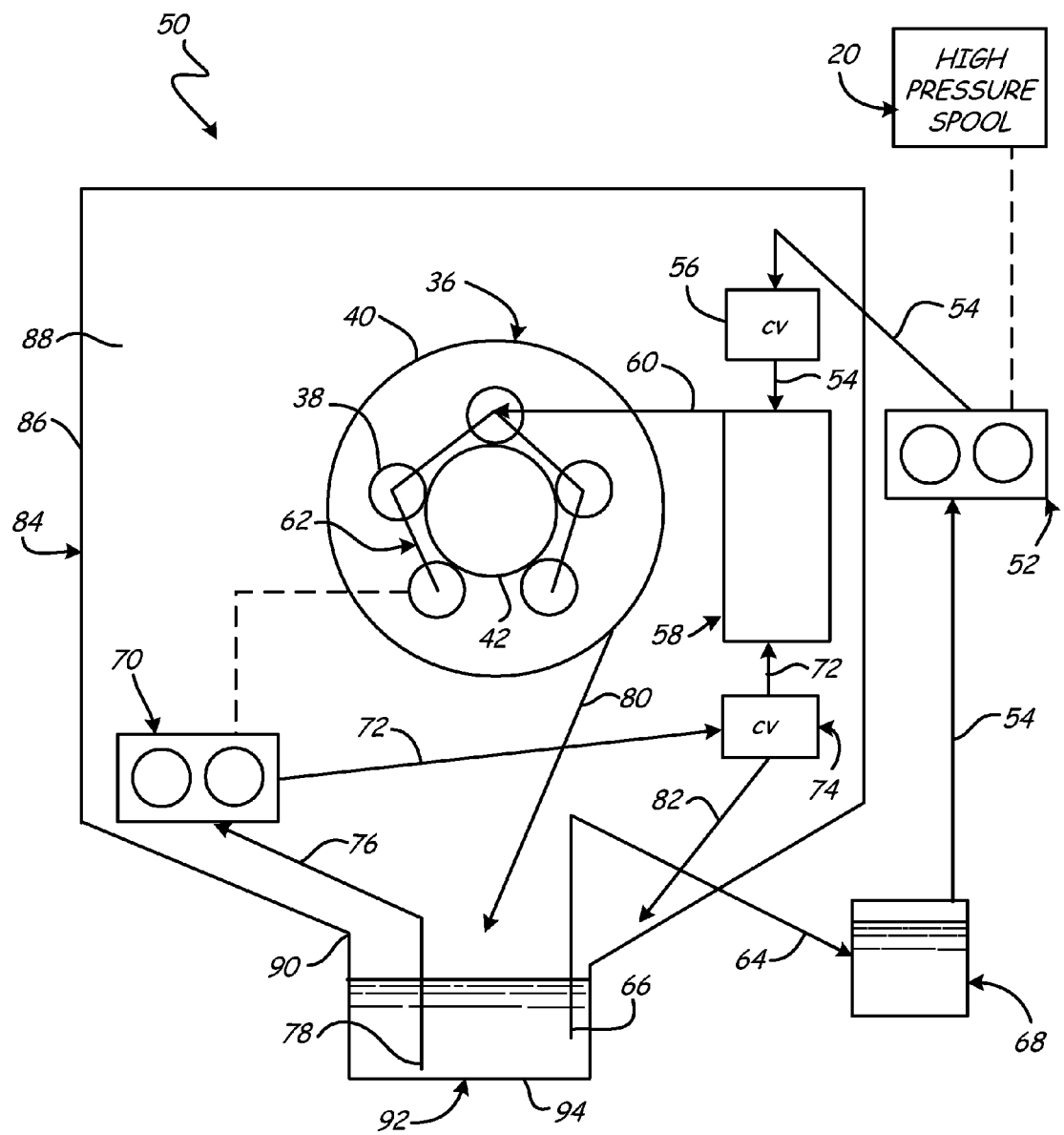
FIG. 2 is a schematic view of a pump system of the present invention.

FIG. 2 is a schematic view of pump system 50 of the present invention. Pump system 50 includes main pump 52, main supply passage 54, main check valve 56, manifold 58, bearing supply passage 60, bearing lubrication distributor 62, main scavenge passage 64, main scavenge inlet 66, main reservoir 68, auxiliary pump 70, auxiliary supply passage 72, auxiliary valve 74, auxiliary scavenge passage 76, auxiliary scavenge inlet 78, fan drive gear system dump passage 80, auxiliary dump passage 82, and compartment 84 (including compartment wall 86, compartment cavity 88, compartment bottom 90, collection reservoir 92, and collection reservoir bottom 94). Compartment wall 86 encloses compartment cavity 88. Collection reservoir 92 can be part of compartment wall 86, located at compartment bottom 90. Collection reservoir 92 can have its own collection reservoir bottom 94. In the illustrated embodiment, substantially all of pump system 50 is located in compartment 84 except for high pressure spool 20, main pump 52, main reservoir 68, and portions of main supply passage 54.

Under ordinary operation conditions, main pump 52 supplies substantially all lubricating liquid necessary for all components in gas turbine engine 10, including for fan drive gear system 36. Main pump 52 is a pump for pumping liquid from main reservoir 68 to main check valve 56. Main pump 52 can be driven by high pressure spool 20, connected through gearing. Main reservoir 68 is fluidically connected to main pump 52, which is fluidically connected to main check valve 56, which is fluidically connected to manifold 58, all via main supply passage 54. Main reservoir 68 holds a lubricating liquid. Main check valve 56 can allow liquid flow from main pump 52 to manifold 58 but reduce liquid flow in the opposite direction. Manifold 58 receives liquid from main supply passage 54 and directs the liquid through bearing supply passage 60 to bearing lubrication distributor 62. Bearing lubrication distributor 62 can be a series of passages for distributing the liquid to star gear 38 (including corresponding journal bearings, not shown in FIG. 2), ring gear 40, and sun gear 42. Liquid supplied to fan drive gear system 36 typically drips off each of the corresponding gears and passes through fan drive gear system dump passage 80 to collection reservoir 92. Main scavenge passage 64 has main scavenge inlet 66 located in collection reservoir 92. Main scavenge passage 64 fluidically connects collection reservoir 92 to main reservoir 68 for returning the liquid to main reservoir 68. Liquid in main reservoir 68 can then be pumped back through the system again.

Auxiliary pump 70 can also supply substantially all lubricating liquid necessary for fan drive gear system 36. Auxiliary pump 70 is a pump for pumping liquid from collection reservoir 92 to auxiliary valve 74. Auxiliary pump 70 can be driven by fan shaft 34, connected through gearing, such that pump 70 turns whenever fan shaft 34 turns. Auxiliary pump 70 is fluidically connected to collection reservoir 92 via auxiliary scavenge passage 76. Auxiliary scavenge passage 76 has auxiliary scavenge inlet 78 located in collection reservoir 92 and near collection reservoir bottom 94. Auxiliary scavenge inlet 78 is closer to collection reservoir bottom 94 than main scavenge inlet 66 is to collection reservoir bottom 94. This configuration allows a quantity of liquid to remain in collection reservoir 92 for use by auxiliary pump 70, as opposed to being scavenged to main reservoir 68. Auxiliary pump 70 is fluidically connected to auxiliary valve 74 via auxiliary supply passage 72. Auxiliary valve 74 is a three way valve, fluidically connected to manifold 58 via auxiliary supply passage 72 and to collection reservoir 92 via auxiliary valve dump passage 82. When pressure in manifold 58 exceeds a pressure threshold, auxiliary valve 74 directs liquid from auxiliary pump 70 through auxiliary valve dump passage 82 to collection reservoir 92. When pressure in manifold 58 is below the pressure threshold, auxiliary valve 74 directs liquid from auxiliary pump 70 to manifold 58. Liquid in manifold 58 can then be supplied to fan drive gear system 36 in the same manner as described with respect to main pump 52, above.

Under ordinary operating conditions, high pressure spool 20 will operate at ordinary operating speed, main pump 52 will supply liquid to manifold 58, and pressure in manifold 58 will be above the pressure threshold. Consequently, auxiliary valve 74 will direct liquid from auxiliary pump 70 to collection reservoir 92. Under certain conditions, main pump 52 will not supply enough liquid to manifold 58 to keep pressure in manifold 58 above the pressure threshold. For example, if high pressure spool 20 stops rotating or rotates at a reduced revolutions per minute (rpm), main pump 52 will also stop rotating or rotate at a reduced rpm. Even if high pressure spool 20 stops rotating, auxiliary pump 70 can continue pumping liquid so long as fan drive gear system 36 continues rotating. Because of the pressure drop in manifold 58, auxiliary valve 74 will direct liquid from auxiliary pump 70 to manifold 58 and, ultimately, to fan drive gear system 36. Consequently, fan drive gear system 36 can be supplied with lubricating liquid whenever it is rotating, even when main pump 52 fails to supply such liquid.

In certain embodiments, pump system 50 can contain one or more conditioning devices to clean and cool the lubricating liquid. These devices can include filters to clean the liquid, heat exchangers to cool the liquid, and valves to increase flow and pressure. In one embodiment, a filter and heat exchanger could be included along supply passage 54. In other embodiments, conditioning devices can be included virtually anywhere within pump system 50 without departing from the spirit and scope of the invention. Such conditioning devices are omitted from FIG. 2 for clarity.

Figure 3:
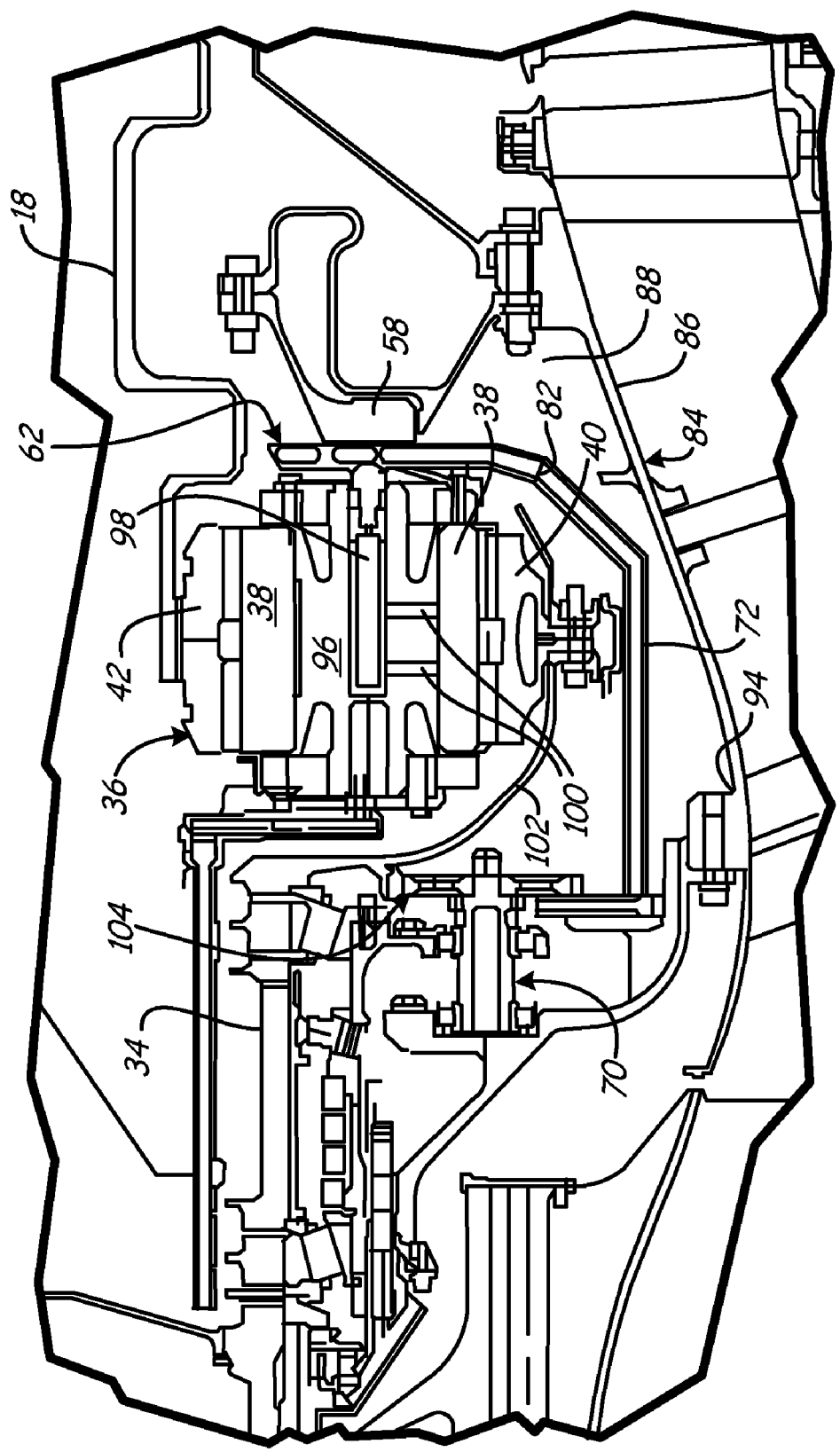
FIG. 3 is a lower cross-sectional view of the fan drive gear system of FIG. 1.

FIG. 3 is a lower cross-sectional view of fan drive gear system 36 in gas turbine engine 10. In addition to those elements described with respect to FIG. 2, above, fan drive gear system 36 further includes bearing 96, having axially extending bearing passage 98, and radially extending bearing passages 100. Bearing 96 can be a journal bearing positioned inside of star gear 38. Bearing lubrication distributor 62 is positioned adjacent to bearing 96 and is fluidically connected to axially extending bearing passage 98 which is, in turn, fluidically connected to radially extending bearing passages 100. Liquid from bearing lubrication distributor 62 can be supplied into axially extending bearing passage 98 where it then passes through radially extending bearing passages 100 in between bearing 96 and star gear 38. The lubricating liquid forms a film of lubrication on bearing 96 to support star gear 38 and reduce friction between an interior surface of star gear 38 and an exterior surface of bearing 96 as star gear 38 rotates.

As illustrated in FIG. 3, ring gear 40 is rigidly attached to fan shaft 34 via fan shaft extension 102. Auxiliary pump 70 is connected to fan shaft extension 102 via auxiliary pump gears 104. Consequently, auxiliary pump 70 can rotate at a higher rotational velocity than fan shaft 34 whenever fan shaft 34 rotates.

Figure 4:
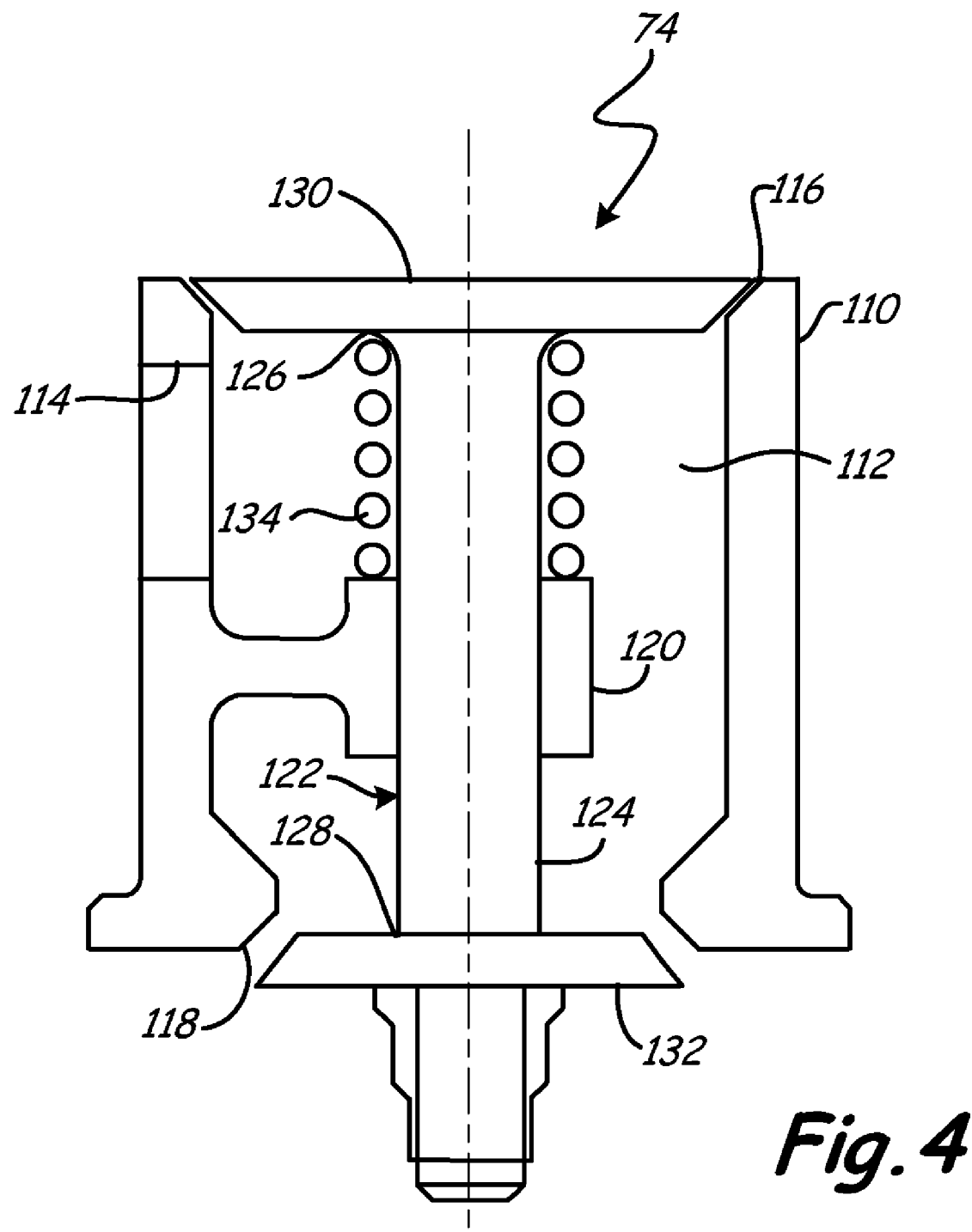
FIG. 4 is a schematic view of an auxiliary valve of the present invention.

FIG. 4 is a schematic view of auxiliary valve 74, which includes valve body 110, valve cavity 112, auxiliary pump port 114, manifold port 116, reservoir port 118, sleeve 120, valve member 122, valve stem 124, first end 126, second end 128, manifold disc 130, reservoir disc 132, and spring 134. Valve body 110 defines valve cavity 112. Valve body 110 includes three ports. Auxiliary pump port 114 fluidically connects valve cavity 112 to auxiliary pump 70 (not shown in FIG. 4). Manifold port 116 fluidically connects valve cavity 112 to manifold 58 (not shown in FIG. 4). Reservoir port 118 fluidically connects valve cavity 112 to collection reservoir 92 (not shown in FIG. 4). In the illustrated embodiment, manifold port 116 has a greater flow area than that of reservoir port 118. A ratio of flow area of manifold port 116 to flow area of reservoir port 118 can be selected to bias the position of valve member 122 toward a position where manifold disc 130 does not close or plug manifold port 116.

Sleeve 120 can be a circular ring fixedly connected to valve body 120. Valve member 122 includes valve stem 124 positioned inside of sleeve 120. Valve stem 124 can be substantially cylindrical in shape with first end 126 and second end 128. Valve stem 124 can slide inside of sleeve 120. Manifold disc 130 can be fixedly attached to first end 126 and sized to plug manifold port 116. Reservoir disc 132 can be fixedly attached to second end 128 and sized to plug reservoir port 118. Valve stem 124 can have a length such that liquid can flow through reservoir port 118 when manifold disc 130 plugs manifold port 116, while liquid can flow through manifold port 116 when reservoir disc 132 plugs reservoir port 118. In the illustrated embodiment, valve stem 124 passes through manifold port 116, valve cavity 112, and reservoir port 118. Spring 134 can bias the position of valve member 122 toward a position where manifold disc 130 does not plug manifold port 116. In the illustrated embodiment, spring 134 is compressed between sleeve 120 and manifold disc 130.

It will be recognized that the present invention provides numerous benefits and advantages. For example, pump system 50 can supply lubricating liquid to fan drive gear system 36 whenever fan 32 is rotating. This can be useful in a variety of circumstances, such as when fan 32 rotates due to wind blowing across it but when gas turbine engine 10 is not operating. This can also be useful when gas turbine engine 10 is operating but when main pump 52 does not supply liquid to fan drive gear system 36. Such situations could occur due to a hose failure or during a safety test that requires shut down of main pump 52. Pump system 50 can supply the liquid automatically, without requiring interaction by a pilot.

Moreover, main pump 52 and auxiliary pump 70 can use the same liquid and much of the same plumbing, thus reducing cost and overall weight as compared to a heavier, more complex system. Because of the unique operation of auxiliary valve 74, liquid from auxiliary pump 70 is not supplied to fan drive gear system 36 during ordinary operating conditions; it is only supplied when necessary. Consequently, liquid from auxiliary pump 70 need not be run through filters so long as the liquid is in condition to lubricate fan drive gear system 36 for the necessary periods.

Additionally, pump system 50 can be relatively simple and reliable, requiring little or no additional maintenance by airlines.

Although the present invention has been described with reference to preferred embodiments, workers skilled in the art will recognize that changes may be made in form and detail without departing from the spirit and scope of the invention. For example, auxiliary pump 70 can be connected to any part of fan shaft 34, low pressure spool 12, or fan drive gear system 36 so long as auxiliary pump 70 rotates whenever fan drive gear system 36 rotates.

The invention claimed is:

1. A pump system for lubricating a bearing in a gear system of a gas turbine, the pump system comprising:
   a main pump fluidically connected to the bearing through a main supply passage;
   an auxiliary pump mechanically connected to the gear system, wherein the auxiliary pump is fluidically connected to the bearing through an auxiliary supply passage and to a reservoir through an auxiliary scavenge passage;
   an auxiliary valve fluidically connected to the auxiliary supply passage, for transferring liquid from the auxiliary pump to the bearing when a pressure in the auxiliary supply passage downstream of the auxiliary valve is less than a particular threshold, and for transferring liquid from the auxiliary pump to the reservoir when the pressure in the auxiliary supply passage downstream of the auxiliary valve is greater than the particular threshold; and a compartment wall defining a compartment cavity, wherein the reservoir is positioned at a bottom of the compartment cavity, wherein a portion of the compartment wall defines the reservoir, and wherein the compartment cavity contains the auxiliary pump, the auxiliary valve, and the bearing.

2. The pump system of claim 1, and further comprising:
   a manifold connected to the main supply passage between the main pump and the bearing and connected to the auxiliary supply passage between the auxiliary valve and the bearing; and
   a main reservoir which is different from the reservoir, which is connected to the main pump through a main supply passage, and which is connected to the reservoir through a main scavenge passage.

3. The pump system of claim 2, wherein the auxiliary valve comprises:
   a valve body defining a valve cavity;
   a manifold port in the valve body, the manifold port fluidically connecting the valve cavity to the manifold;
   a reservoir port in the valve body, the reservoir port fluidically connecting the valve cavity to the reservoir;
   an auxiliary pump port in the valve body, the auxiliary pump port fluidically connecting the valve cavity to the auxiliary pump; and
   a valve stem comprising a first end and a second end, the first end connected to a manifold disc and the second end connected to a reservoir disc, wherein the valve stem passes through the manifold port, the valve cavity, and the reservoir port, wherein the manifold disc is sized to close the manifold port, the reservoir disc is sized to close the reservoir port, and the valve stem is sized to allow liquid flow through the reservoir port when the manifold port is closed by the manifold disc.

4. The pump system of claim 3, wherein the auxiliary valve further comprises:
   a spring for applying a force on the valve stem, biasing the valve stem toward a position where the manifold disc does not close the manifold port.

5. The pump system of claim 3, wherein the manifold port has a greater flow area than the reservoir port.

6. The pump system of claim 1, and further comprising:
   a main scavenge passage fluidically connecting the main pump to the reservoir, wherein the main scavenge passage has a main scavenge inlet positioned in the reservoir and the auxiliary scavenge passage has an auxiliary scavenge inlet positioned in the reservoir, wherein the reservoir has a reservoir bottom, and wherein the auxiliary scavenge inlet is oriented closer to the reservoir bottom than the main scavenge inlet is to the reservoir bottom.

7. The pump system of claim 1, wherein the gear system comprises a fan drive gear system connecting a fan shaft to a low pressure spool in a gas turbine engine.

8. The pump system of claim 7, wherein the main pump is connected through gearing to a high pressure spool.

9. A gas turbine engine comprising:
   a spool comprising a compressor fixedly connected to a turbine via a spool shaft;
   a fan drive gear system that includes a bearing;
   a fan shaft connected through the fan drive gear system to the spool;
   a reservoir for holding liquid; and
   an auxiliary pump system comprising:
      an auxiliary pump mechanically connected to the fan drive gear system and fluidically connected to the reservoir; and
      a valve, fluidically connected to the auxiliary pump via a first passage and to the bearing via a second passage, the valve comprising:
         a valve body defining a valve cavity;
         a first, second, and third port in the valve body;
         a valve member with a first position and a second position relative to the valve body, wherein the auxiliary pump is fluidically connected to the bearing through the first and second ports when the valve member is in the first position and wherein the auxiliary pump is fluidically connected to the reservoir through the first and third ports when the valve member is in the second position; and a compartment wall defining a compartment cavity, wherein the reservoir is positioned at a bottom of the compartment cavity, wherein a portion of the compartment wall defines the reservoir, and wherein the compartment cavity contains the auxiliary pump, the valve, and the bearing.

10. The gas turbine engine of claim 9, wherein the auxiliary pump system further comprises:
    a manifold fluidically connected to the second passage between the valve and the bearing.

11. The gas turbine engine of claim 10, wherein the valve member comprises:
    a valve stem comprising a first end and a second end, the first end connected to a manifold disc and the second end connected to a reservoir disc, wherein the valve stem passes through the second port, the valve cavity, and the third port, wherein the manifold disc is sized to close the second port, the reservoir disc is sized to close the third port, and the valve stem is sized to allow liquid flow through the third port when the second port is closed by the manifold disc.

12. The gas turbine engine of claim 10, wherein the valve further comprises:
a spring for applying a force on the valve member, biasing the valve member toward the first position.

13. The gas turbine engine of claim 10, wherein the second port has a greater flow area than the third port.

14. A method for circulating liquid in a gas turbine engine, the method comprising:
driving a main pump via a high pressure spool operably coupled to the main pump;
pumping a lubricating liquid with the main pump from a main reservoir to a bearing, collecting the lubricating liquid in a collection reservoir which is different than the main reservoir after use by the bearing, and transferring the lubricating liquid from the collection reservoir back to the main reservoir, when a high pressure spool is rotating at an operating speed;
driving an auxiliary pump via a fan shaft connected to the auxiliary pump via auxiliary pump gears;
pumping the lubricating liquid with the auxiliary pump from the collection reservoir to the bearing and collecting the lubricating liquid in the collection reservoir after use by the bearing, when the high pressure spool is rotating below the operating speed; and a compartment wall defining a compartment cavity, wherein the collection reservoir is positioned at a bottom of the compartment cavity, wherein a portion of the compartment wall defines the collection reservoir, and wherein the compartment cavity contains the auxiliary pump and the bearing.

15. The method of claim 14, and further comprising the step of:
dumping the lubricating liquid pumped by the auxiliary pump to the collection reservoir prior to lubricating the bearing, when the high pressure spool is rotating at the operating speed.

16. The method of claim 14, and further comprising the steps of:
collecting the lubricating liquid pumped by the main pump in a manifold prior to supplying the lubricating liquid to the bearing, when the high pressure spool is rotating at the operating speed; and
collecting the lubricating liquid pumped by the auxiliary pump in the manifold prior to supplying the lubricating liquid to the bearing, when the high pressure spool is rotating below the operating speed.

17. The method of claim 16, and further comprising the step of:
reducing flow of the lubricating liquid in a direction from the manifold to the main pump, when the high pressure spool is not rotating.

18. The method of claim 14, and further comprising the step of:
pumping the lubricating liquid with the auxiliary pump from the collection reservoir to the bearing and collecting the lubricating liquid in the collection reservoir after use by the bearing, when the high pressure spool is not rotating.

19. The method of claim 14, and further comprising the step of:
driving the fan shaft via a low pressure spool connected to the fan shaft via fan drive gears

* * * * *